United States Patent
Burns et al.

(10) Patent No.: US 8,133,311 B2
(45) Date of Patent: *Mar. 13, 2012

(54) PIGMENT DIPSERSIONS COMPRISING FUNCTIONALIZED NON-POLYMERIC DISPERSANTS

(75) Inventors: Elizabeth G. Burns, Windham, NH (US); James A. Belmont, Acton, MA (US); Alexander I. Shakhnovich, Westford, MA (US)

(73) Assignee: Cabot Corporation, Boston, MA (US)

( * ) Notice: Subject to any disclaimer, the term of this patent is extended or adjusted under 35 U.S.C. 154(b) by 461 days.

This patent is subject to a terminal disclaimer.

(21) Appl. No.: 11/796,901

(22) Filed: Apr. 30, 2007

(65) Prior Publication Data

US 2008/0264298 A1    Oct. 30, 2008

(51) Int. Cl.
 C09D 11/00    (2006.01)
(52) U.S. Cl. .................................. 106/31.6; 106/31.86
(58) Field of Classification Search ................. 106/31.6, 106/31.86
See application file for complete search history.

(56) References Cited

U.S. PATENT DOCUMENTS

| | | | |
|---|---|---|---|
| 3,446,641 A | 5/1969 | Mitchell et al. | |
| 3,532,662 A | 10/1970 | Ansdell | |
| 4,150,020 A | 4/1979 | Swidler et al. | |
| 4,491,481 A | 1/1985 | Robertson et al. | |
| 4,698,431 A | 10/1987 | Raymond et al. | |
| 5,281,261 A | 1/1994 | Lin | |
| 5,500,141 A | 3/1996 | Kormann et al. | |
| 5,624,901 A | 4/1997 | Raymond et al. | |
| 5,630,868 A | 5/1997 | Belmont et al. | |
| 5,672,198 A | 9/1997 | Belmont | |
| 5,698,016 A | 12/1997 | Adams et al. | |
| 5,707,432 A | 1/1998 | Adams et al. | |
| 5,708,095 A | 1/1998 | Grezzo Page et al. | |
| 5,713,993 A | 2/1998 | Grezzo Page et al. | |
| 5,750,594 A | 5/1998 | Page et al. | |
| 5,795,376 A | 8/1998 | Ide | |
| 5,803,959 A | 9/1998 | Johnson et al. | |
| 5,837,045 A | 11/1998 | Johnson et al. | |
| 5,885,335 A | 3/1999 | Adams et al. | |
| 5,922,118 A | 7/1999 | Johnson et al. | |
| 5,958,999 A | 9/1999 | Bates et al. | |
| 6,042,643 A | 3/2000 | Belmont et al. | |
| 6,150,433 A | 11/2000 | Tsang et al. | |
| 6,187,086 B1 | 2/2001 | Rehman | |
| 6,203,909 B1 | 3/2001 | Chassot | |
| 6,204,307 B1 | 3/2001 | Miyabayashi | |
| 6,210,473 B1 * | 4/2001 | Boils et al. ................. | 106/31.43 |
| 6,214,100 B1 | 4/2001 | Parazak et al. | |
| 6,221,476 B1 | 4/2001 | Bruening et al. | |
| 6,221,932 B1 | 4/2001 | Moffatt et al. | |
| 6,281,267 B2 | 8/2001 | Parazak | |
| 6,323,257 B1 | 11/2001 | Moffatt et al. | |
| 6,328,894 B1 | 12/2001 | Chan et al. | |
| 6,395,805 B1 | 5/2002 | Takao | |
| 6,458,458 B1 | 10/2002 | Cooke et al. | |
| 6,506,706 B1 | 1/2003 | Bruening et al. | |
| 6,533,851 B2 | 3/2003 | Lee et al. | |
| 6,538,047 B1 | 3/2003 | Miyabayashi | |
| 6,544,422 B2 | 4/2003 | Tarbet et al. | |
| 6,585,817 B2 | 7/2003 | Lee et al. | |
| 6,592,657 B2 | 7/2003 | Lee et al. | |
| 6,623,644 B2 | 9/2003 | Bruening et al. | |
| 6,641,653 B2 | 11/2003 | Yu | |
| 6,641,656 B2 | 11/2003 | Yu et al. | |
| 6,653,367 B2 | 11/2003 | Miyabayashi | |
| 6,719,905 B2 | 4/2004 | Bruening et al. | |
| 6,723,783 B2 | 4/2004 | Palumbo et al. | |
| 6,814,789 B2 | 11/2004 | Uhlir-Tsang et al. | |
| 6,831,194 B2 | 12/2004 | Srinivas | |
| 6,833,026 B2 | 12/2004 | Palumbo | |
| 6,866,707 B2 | 3/2005 | Kato | |
| 6,896,726 B2 | 5/2005 | Bugnon et al. | |
| 6,916,367 B2 | 7/2005 | Palumbo | |
| 6,960,250 B2 | 11/2005 | Luethge et al. | |
| 7,005,004 B2 | 2/2006 | Kalbitz et al. | |
| 7,160,377 B2 | 1/2007 | Zoch et al. | |
| 7,300,504 B2 | 11/2007 | Shakhnovich | |
| 7,347,894 B2 | 3/2008 | Yanagimoto et al. | |
| 7,393,403 B2 | 7/2008 | Lee et al. | |
| 7,427,361 B2 | 9/2008 | Small et al. | |
| 7,459,491 B2 | 12/2008 | Tyvoll et al. | |
| 7,501,017 B2 | 3/2009 | Sarkisian et al. | |
| 7,648,570 B2 * | 1/2010 | Deroover ................... | 106/31.77 |
| 7,704,312 B2 * | 4/2010 | Deroover et al. .......... | 106/31.75 |
| 2002/0147252 A1 | 10/2002 | Adams et al. | |
| 2004/0265348 A1 * | 12/2004 | Hollenberg et al. .......... | 424/401 |
| 2006/0089422 A1 | 4/2006 | Vasudevan et al. | |
| 2006/0243165 A1 | 11/2006 | Luthge et al. | |

(Continued)

FOREIGN PATENT DOCUMENTS

EP    0403797    12/1990

(Continued)

OTHER PUBLICATIONS

JP03-193357 to Taiho Ind Co Ltd (Aug. 23, 1991)—Abstract Only.
JP2002-167529 to Konica Corp (Jun. 11, 2002)—Abstract Only.
JP2002-371213 to Mitsubishi Chemicals Corp (Dec. 26, 2002)—Abstract Only.
JP2004-075825 to Fuji Photo Film Co Ltd (Mar. 11, 2004)—Abstract Only.

(Continued)

*Primary Examiner* — Jerry Lorengo
*Assistant Examiner* — Veronica F Faison

(57) ABSTRACT

The present invention relates to pigment dispersions comprising a liquid vehicle, a pigment, and a non-polymeric dispersant comprising at least one functional groups. Various embodiments of the functional group are disclosed. For each of these embodiments, preferably the functional group has a defined calcium index value. Also disclosed are various uses for these dispersions, including inkjet ink compositions.

16 Claims, No Drawings

U.S. PATENT DOCUMENTS

| | | |
|---|---|---|
| 2007/0044682 A1 | 3/2007 | Nick et al. |
| 2007/0100023 A1* | 5/2007 | Burns et al. ............ 523/160 |
| 2007/0100024 A1* | 5/2007 | Gu et al. ............... 523/160 |
| 2007/0126839 A1 | 6/2007 | Kelly-Rowley et al. |
| 2007/0277699 A1 | 12/2007 | Bauer |
| 2008/0083347 A1 | 4/2008 | Palumbo |

FOREIGN PATENT DOCUMENTS

| | | |
|---|---|---|
| EP | 1061106 | 8/2003 |
| GB | 2373789 | 6/2004 |
| GB | 2385331 | 4/2005 |
| WO | WO97/12944 | 4/1997 |
| WO | WO2005/090486 | 9/2005 |
| WO | WO2005/123855 | 12/2005 |
| WO | WO 2007060264 A2 * | 5/2007 |

OTHER PUBLICATIONS

JP2005-029606 to Color Chemical Kogyo KK (Feb. 3, 2005)—Abstract Only.

JP2005-225955 to Ricoh Co Ltd (Aug. 25, 2005)—Abstract Only.

* cited by examiner

PIGMENT DIPSERSIONS COMPRISING FUNCTIONALIZED NON-POLYMERIC DISPERSANTS

BACKGROUND OF THE INVENTION

1. Field of the Invention

The present invention relates to pigment dispersions comprising non-polymeric dispersants having specific functional groups and uses thereof.

2. Description of the Related Art

In general, pigments alone are not readily dispersible in liquid vehicles, and a variety of techniques have been developed that can provide stable pigment dispersions useful in applications such as inkjet printing. For example, dispersants can be added to the pigment to improve its dispersibility in a particular medium. Examples of dispersants include water-soluble polymers and surfactants. A wide variety of polymers have been used as dispersants, and these are often tailored to the type of pigment to be dispersed. For example, JP 10-130554 describes inkjet ink compositions comprising substituted quinolonoquinolones which further comprise a rosin, resin, surfactant, or dispersant, such as a three-component copolymer composed of methyl methacrylate, ethyl acrylate, and methacrylic acid.

Non-polymeric materials can also be used as dispersants for inkjet inks. For example, U.S. Pat. No. 5,750,323 describes a solid particle aqueous dispersion of a colorant dispersed using a relatively small amount of a compound that is structurally similar to the colorant. This structurally similar additive is structurally distinct from the colorant and contains an identical structural section making up at least 75% of the total molecular weight of the colorant. The additive has at least one substitutent bonded to the identical structural section that has a molecular weight higher than the corresponding substituent of the colorant. However, such additives are described for non-pigment colorants (i.e., filter dyes).

In addition, U.S. Pat. No. 5,716,435 describes a water-dispersed inkjet recording liquid prepared by a salt-milling method in which a mixture containing an organic pigment, a water-soluble inorganic salt, and a water-soluble solvent is mechanically kneaded. A pigment derivative, which is a substituted derivative of a pigment residue or heterocyclic ring residue, or a resin, which is a polymeric dispersant, may also be included. However, such a composition requires the use of both the pigment derivative and polymeric dispersants as separate additives, each of which may be affected by other components in the inkjet ink composition.

Dispersants having pigment derivatives attached to a polymeric group have also been described. For example, GB 2036779 describes polyether disazo dyestuffs having specified formulas which includes a disazo dye and an attached polyalkylene oxide group. These dyestuffs are useful for dying and printing synthetic fibers. Also, JP 63-175080, JP 06-065521, JP 07-041689, and JP 2993088d each describe pigment compositions comprising a pigment and a polymer having an attached quinacridone derivative, which can be used for dispersing a pigment for coatings or varnishes. However, none of these references teaches the use of such additives for the demanding requirements of inkjet ink compositions.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt.

Other methods to prepare modified pigments, including those having attached polymeric groups, have also been described. For example, PCT Publication No. WO 01/51566 discloses methods of making a modified pigment by reacting a first chemical group and a second chemical group to form a pigment having attached a third chemical group. Ink compositions, including inkjet inks, containing these pigments are also described. In addition, U.S. Pat. Nos. 5,672,198, 5,922,118, 6,042,643, and 6,641,656 disclose modified pigments having various attached groups, including phosphonic acid groups. Also, U.S. Pat. Nos. 6,328,894, 6,398,858, 6,436,178, 6,494,943, and 6,506,245 disclose modified pigments having various attached groups, including aryl polycarboxylic acid groups, including 1,2,3-benzene tricarboxylic acid groups. Compositions comprising these modified pigments, including inkjet ink compositions, are also shown. Also, polymer coated carbon products and methods for their preparation are described in U.S. Pat. No. 6,458,458.

As the inkjet printing industry moves towards print performance similar to that of laser printing, there remains a need for inkjet ink compositions comprising pigments and a dispersant having improved properties, such as improved optical density, thereby providing alternatives to modified pigment dispersions.

SUMMARY OF THE INVENTION

The present invention relates to a pigment dispersion comprising a liquid vehicle, a pigment, and at least one non-polymeric dispersant comprising at least one functional group. Several embodiments of the invention are described. In a first embodiment, the functional group comprises at least two phosphonic acid groups, partial esters thereof, or salts thereof. In a second embodiment, the functional group comprises at least one hydroxamic acid group or salt thereof. In a third embodiment, the functional group comprises at least one heterocyclic group having at least one OH group or salt thereof. In a fourth embodiment, the functional group comprises at least one phosphonic acid group or salt thereof and at least one second ionic, ionizable or basic group. In a fifth embodiment, the functional group comprises at least one heteroaryl group having at least one carboxylic acid group or salt thereof. In a sixth embodiment, the functional group comprises an aryl group having at least one nitroso group and at least one OH group, or a salt thereof. In a seventh embodiment, the functional groups comprises an azoarene group having an azo group and at least two OH groups, at least two $NH_2$ groups, or at least one OH group and at least one $NH_2$ group and has the formula $Ar^1$—N=N—$Ar^2$, wherein $Ar^1$ and $Ar^2$, which can be the same or different, are an arylene group or an aryl group and at least one of $Ar^1$ or $Ar^2$ is an arylene group. Preferably, for each of these embodiments, the functional group has a calcium index value greater than a calcium index value of phenylphosphonic acid and more preferably greater than a calcium index value of 1,2,3-benzene tricarboxylic acid. The present invention further relates to compositions comprising or prepared from these dispersions.

It is to be understood that both the foregoing general description and the following detailed description are exemplary and explanatory only and are intended to provide further explanation of the present invention, as claimed.

DETAILED DESCRIPTION OF THE INVENTION

The present invention relates to dispersions comprising a vehicle, a pigment, and specified dispersants, and uses thereof.

The vehicle of the dispersion of the present invention is a liquid vehicle and may be either a non-aqueous vehicle or an aqueous vehicle. Preferably, the vehicle is an aqueous vehicle, which is a vehicle that contains greater than 50% water. For example, the aqueous vehicle can be water or mixtures of water with water miscible solvents such as alcohols. Preferably the aqueous vehicle is water, and the dispersion is an aqueous pigment dispersion, such as an aqueous inkjet ink composition.

The pigment of the dispersion of the present invention can be any type of pigment conventionally used by those skilled in the art, including carbonaceous black pigments and organic colored pigments. Mixtures of different pigments can also be used. Representative examples of carbonaceous black pigments include various carbon blacks (Pigment Black 7) such as channel blacks, furnace blacks, gas blacks, and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Representative examples of organic colored pigments include, for example, blue, black, brown, cyan, green, white, violet, magenta, red, orange, or yellow organic pigments. Suitable classes include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). Preferably the pigment is a cyan pigment, such as Pigment Blue 15 or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

The pigment may also be a pigment, particularly a carbonaceous black pigment, that has been oxidized using an oxidizing agent in order to introduce ionic and/or ionizable groups onto the surface but do not form stable dispersions without an additional dispersant. Pigments prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, pigments, particularly carbonaceous black pigments, prepared using other surface modification methods to introduce ionic or ionizable groups onto a pigment surface, such as chlorination and sulfonylation, but do not form stable dispersions without an additional dispersant may also be used.

The pigment may also be a modified pigment comprising a pigment having attached at least one organic group. The modified pigment does not form stable dispersions without an additional dispersant. Preferably the organic group is directly attached. For example, the modified pigment may be a pigment having attached at least one ionic group, at least one ionizable group, or a mixture thereof. Preferably the ionic or ionizable group is an anionic or anionizable group. Organic anionic groups include those described in U.S. Pat. No. 5,698,016, the description of which is fully incorporated herein by reference. Representative examples of anionic groups include —$COO^-$, —$SO_3^-$, —$OSO_3^-$, —$HPO_3^-$, —$OPO_3^{-2}$, and —$PO_3^{-2}$. Representative examples of anionizable groups include —COOH, —$SO_3H$, —$PO_3H_2$, —R'SH, —R'OH, and —$SO_2NHCOR'$, where R', which can be the same or different, represents hydrogen or an organic group such as a substituted or unsubstituted aryl and/or alkyl group. For example, the attached organic group comprises a carboxylic acid group, a sulfonic acid group, a phosphonic acid group, or salts thereof, including a —$C_6H_4COOH$ group, a —$C_6H_4SO_3H$, or salts thereof. In addition, the organic group may be a polymeric group that comprises an ionic group, ionizable group, or salt thereof. The modified pigments may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Other methods for preparing the modified pigments include reacting a pigment having available functional groups with a reagent comprising the organic group, such as is described in, for example, U.S. Pat. No. 6,723,783, which is incorporated in its entirety by reference herein. In addition modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

As noted above, the pigment used in the dispersion of the present invention may be an organic colored pigment. In general, the colorant of an organic colored pigment comprises an organic chromophore group, which may be further substituted with various substituents. As used herein, the term "organic chromophore group" is that portion of the chemical structure of the colorant that provides the essential color of the colorant. The term "substituent" is a group, particularly a functional group, bonded to the chromophore that further defines the specific color and hue of the colorant and differentiates it from other pigments in the same colorant class. Thus, the organic chromophore group is that portion of the colorant structure to which the substituents are bonded and would be considered to be the backbone or skeleton structure of the colorant.

For example, one class of yellow pigments comprises a quinolonoquinolone colorant. Examples of this type of pigment are Pigment Yellow 218, Pigment Yellow 220, and Pigment Yellow 221, which are shown below:

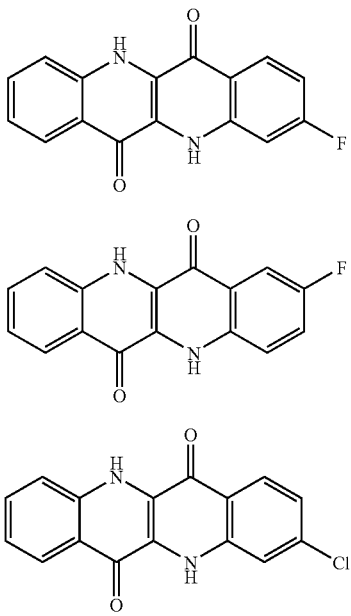

PY 218

PY 220

PY 221

For this class of pigments, the organic chromophore group of the colorant would be a quinolonoquinolonyl group and the substituents would be halogen groups. In a similar way, Pigment Violet 19, Pigment Red 122, and Pigment Red 202 each comprise a quinacridone colorant as follows:

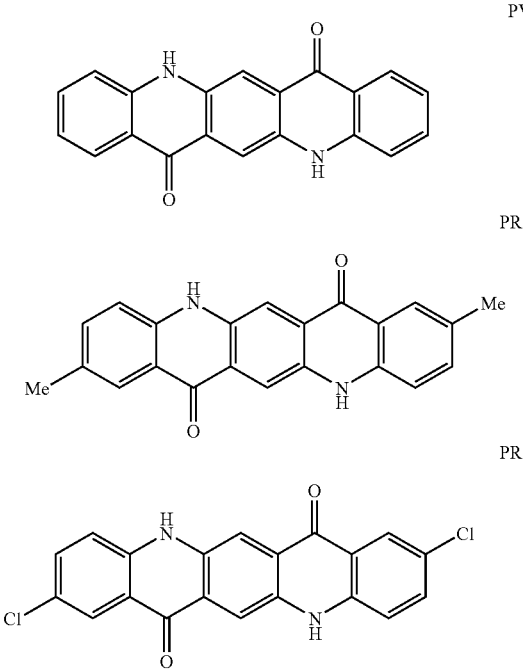

PV 19

PR 122

PR 202

Thus, for this class of pigments, the organic chromophore group of the colorant would be the quinacridonyl group. For Pigment Red 122, there are two methyl group substituents and for Pigment Red 202, there are two chlorine group substituents. For Pigment Violet 19, there are no substituents, and the colorant is the organic chromophore.

In the inkjet ink compositions of the present invention, the pigment may comprise a colorant having the formula $A\text{-}(B)_x$. A is an organic chromophore group and B is a substituent on A, as defined above. The number of substituents is represented by x and can be any value from 0 to the total number of available sites on the organic chromophore group, depending on the specific colorant class. Preferably x has a value of 0, 1, 2, 3, or 4, although higher levels of substitution may also be possible. When x is greater than or equal to one (i.e, A has more than one substituent), each B can be the same or different. Thus, preferably, A has up to 4 various types of substituents or can have up to 4 of the same substituent.

For example, the pigment can be a yellow pigment comprising an azo colorant having the formula $A\text{-}(B)_x$, wherein A is a 2-(phenylazo)-N-(phenyl)-3-oxobutanamidyl group, B is a substituent on A, and x represents the number of substituents, B. Examples of B include alkoxy groups, especially methoxy groups, and nitro groups. For example, the pigment may be Pigment Yellow 74, which comprises a 2-((2-methoxy-4-nitrophenyl)azo)-N-(2-methoxyphenyl)-3-oxobutanamide colorant. For this colorant, the organic chromophore group A is as described above and has 3 substituents B—two methoxy groups and one nitro group. Thus, x is 3. Other azo colorants will be known to one skilled in the art.

As additional examples, the pigment can be a cyan pigment comprising a phthalocyanine colorant having the formula $A\text{-}(B)_x$, wherein A is a phthalocyaninyl group, such as a copper phthalocyaninyl group. Also, the pigment can be a magenta pigment comprising a quinacridone colorant having the formula $A\text{-}(B)_x$, wherein A is a quinacridonyl group.

The pigment can have a wide range of BET surface areas, as measured by nitrogen adsorption, depending on the desired properties of the pigment. Preferably, the pigments have a BET surface area between about 10 $m^2/g$ and about 1500 $m^2/g$, more preferably between about 20 $m^2/g$ and about 600 $m^2/g$ and most preferably between about 50 $m^2/g$ and about 300 $m^2/g$. If the desired surface area is not readily available for the desired application, it is also well recognized by those skilled in the art that the pigment may be subjected to conventional size reduction or comminution techniques, such as ball or jet milling or sonication, to reduce the pigment to a smaller particle size, if desired. Also, the pigment can have a wide variety of primary particle sizes known in the art. For example, the pigment may have a primary particle size of between about 5 nm to about 100 nm, including about 10 nm to about 80 nm and 15 nm to about 50 nm. In addition, the pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g. Also, the pigment may be an organic colored pigment having an oil adsorption value (as described in ISO 787 T5) of from about 5 to 150 mL/100 g, including from about 10 to 100 mL/100 g and from about 20 to 80 mL/100 g.

The pigment dispersion of the present invention further comprises a non-polymeric dispersant, which is a dispersant that does not comprise a polymeric group. As such, the dispersants used in the dispersion, such an inkjet ink composition, of the present invention does not comprise a group that is prepared by the addition polymerization of monomers, including free radical polymerization, or by condensation polymerization. Thus, the non-polymeric dispersant has a molecular weight which is less than about 2000, preferably less than about 1500, and more preferably less than about 1000.

The non-polymeric dispersant is a compound having at least one group with a strong affinity to the pigment and at least one group with a strong affinity to the vehicle. Groups having a strong affinity to the pigment include alkyl groups, alkenyl groups, alkynyl groups, aryl and heteroaryl groups, alkaryl groups, and alkylene oxide groups. Each of these may be further substituted with additional functional groups, but such groups should not interfere with the dispersants affinity to the pigment. Derivatives of these groups can also be used, such as ester, ether, or amide derivatives. Examples of alkyl groups include linear, branched and cyclic alkyl groups, preferably having at least 6 carbons, such as a C12, C16, C18, norbornyl, or adamantyl group. Examples of alkenyl groups include linear, branched, and cyclic alkenyl groups, preferably having at least 6 carbons, such as a C12, C16, or C18 alkenyl group, including isoprenoidyl groups such as those derived from squalene. Examples of alkynyl groups include acetylenic alcohol groups such as acetylenic diol groups. Examples of aryl groups include biphenyl groups, terphenyl groups, diphenyl and triphenyl methyl groups, groups derived from naphthalene, anthracene, phenanthrene, fluorene, pyrene, and other fused aromatic systems, and phenolic groups such as those derived from nonylphenol, catechols, and bisphenols, including bisphenol-A. Examples of heteroaryl groups include groups derived from pyridine, quinoline, pyrrole, indole, carbazole, and benzofuran as well as groups derived from phenazine dyes such as nigrosine. Examples of alkylene oxide groups include groups having the formula $-((CH_2)_m-O)-$ wherein m is 3 to 12 or having the formula $-(CH_2CR_2-O)-$ wherein R is independently H or a C1 to C6 alkyl group, such as dipropylene and tripropylene glycol groups. Other groups having a strong affinity to a pigment will be known to one skilled in the art.

The non-polymeric dispersant further comprises at least one functional group. In a first embodiment of the present invention, the functional group comprises at least one phosphorus-containing group having at least one P—O or P=O bond, such as at least one phosphonic acid group, at least one phosphinic acid group, at least one phosphinous acid group, at least one phosphite group, at least one phosphate, diphosphate, triphosphate, or pyrophosphate groups, partial esters thereof, or salts thereof. For example, the functional group may comprise at least one phosphonic acid group, partial ester thereof, or salt thereof. Preferably the functional group comprises at least two of these groups, such as at least two phosphonic acid groups, partial esters thereof, or salts thereof. By "partial ester thereof" is meant that the phosphonic acid group may be a partial phosphonic acid ester group having the formula $-PO_3RH$, or a salt thereof, wherein R is an aryl, alkaryl, aralkyl, or alkyl group. When the functional group comprises at least two phosphonic acid groups or salts thereof, either or both of the phosphonic acid groups may be a partial phosphonic ester group. Also, one of the phosphonic acid groups may be a phosphonic acid ester having the formula $-PO_3R_2$ while the other phosphonic acid group may be either a partial phosphonic ester group, a phosphonic acid group, or a salt thereof. However, it is preferred that, for this embodiment, at least one of the phosphonic acid groups is either a phosphonic acid, a partial ester thereof, or salts thereof. By "salts thereof" is meant that the phosphonic acid group may be in a partially or fully ionized form having a cationic counterion. When the functional group comprises at least two phosphonic acid groups, either or both of the phosphonic acid groups may be in either a partially or fully ionized form. Thus, preferably the functional group comprises at least two phosphonic acid groups, wherein either or both may have the formula $-PO_3H_2$, $-PO_3H^-M^+$ (monobasic salt), or $-PO_3^{-2}M^+_2$ (dibasic salt), wherein $M^+$ is a cation such as $Na^+$, $K^+$, $Li^+$, or $NR_4^+$, wherein R, which can be the same or different, represents hydrogen or an organic group such as a substituted or unsubstituted aryl, alkyl, aralkyl, or alkaryl group.

For this embodiment, the functional group may comprise at least one geminal bisphosphonic acid group, partial esters thereof, or salts thereof—that is, the functional group may comprise at least two phosphonic acid groups, partial esters thereof, or salts thereof that are directly bonded to the same carbon atom. Such a group may also be referred to as a 1,1-diphosphonic acid group, partial ester thereof, or salt thereof. Thus, for example, the functional group may have the formula $-CQ(PO_3H_2)_2$, partial esters thereof, or salts thereof. Q is bonded to the geminal position and may be H, R, OR, SR, or $NR_2$ wherein R, which can be the same or different, is H, a C1-C18 saturated or unsaturated, branched or unbranched alkyl group, a C1-C18 saturated or unsaturated, branched or unbranched acyl group, an aralkyl group, an alkaryl group, or an aryl group. For example, Q may be H, R, OR, SR, or $NR_2$, wherein R, which can be the same or different, is H, a C1-C6 alkyl group, or an aryl group. Preferably Q is H, OH, or $NH_2$. Furthermore, the functional group may have the formula $-(CH_2)_n-CQ(PO_3H_2)_2$, partial esters thereof, or salts thereof, wherein Q is as described above and n is 0 to 9, such as 1 to 9. Preferably n is 0 to 3, such as 1 to 3, and more preferably, n is either 0 or 1.

In addition, the functional group may have the formula $-N-[(CH_2)_m(PO_3H_2)]_2$, partial esters thereof, or salts thereof, wherein m, which can be the same or different, is 1 to 9. Preferably m is 1 to 3 and more preferably is 1 or 2. For example, the functional group may comprise at least one group having the formula $-(CH_2)_n-N-[(CH_2)_m(PO_3H_2)]_2$, partial esters thereof, or salts thereof, wherein n is 0 to 9, such as 1 to 9, and is preferably 0 to 3, such as 1 to 3, and m is as defined above.

In addition, the functional group may have the formula $-CR=C(PO_3H_2)_2$, partial esters thereof, or salts thereof. R can be H, a C1-C18 saturated or unsaturated, branched or unbranched alkyl group, a C1-C18 saturated or unsaturated, branched or unbranched acyl group, an aralkyl group, an alkaryl group, or an aryl group. Preferably, R is H, a C1-C6 alkyl group, or an aryl group.

For this embodiment, the functional group may comprise more than two phosphonic acid groups, partial esters thereof, or salts thereof and may, for example comprise more than one type of group (such as two or more) in which each type of group comprises at least two phosphonic acid groups, partial esters thereof, or salts thereof. For example, the functional group may have the formula $-X-[CQ(PO_3H_2)_2]_p$, partial esters thereof, or salt thereof. X and Q are as described above, and preferably X is an arylene, heteroarylene, alkylene, alkarylene, or aralkylene group. In this formula, p is 1 to 4 and is preferably 2.

In addition, the functional group may comprise at least one vicinal bisphosphonic acid group, partial ester thereof, or salts thereof, meaning that these groups are adjacent to each other. Thus, the functional group may comprise two phosphonic acid groups, partial esters thereof, or salts thereof bonded to adjacent or neighboring carbon atoms. Such groups are also sometimes referred to as 1,2-diphosphonic acid groups, partial esters thereof, or salts thereof. The group comprising the two phosphonic acid groups, partial esters thereof, or salts thereof may be an aromatic group or an alkyl group, and therefore the vicinal bisphosphonic acid group may be a vicinal alkyl or a vicinal aryl diphosphonic acid group, partial ester thereof, or salts thereof. For example, the functional group may have the formula —$C_6H_3$—$(PO_3H_2)_2$, partial esters thereof, or salts thereof, wherein the acid, ester, or salt groups are in positions ortho to each other.

In a second embodiment of the present invention, the functional group comprises at least one hydroxamic acid group or salt thereof. Thus, the functional group may comprise at least one group having the formula —N(OH)—CO— or a salt thereof. Such groups include, for example, amide or imide groups in which the amide or imide nitrogen is substituted with an OH group, and tautomers thereof. The hydroxamic acid group may be acyclic, in which the N—C bond is part of a non-cyclic group, or cyclic, in which the N—C bond is part of a cyclic group. Preferably, the functional group is a cyclic hydroxamic acid group, and more preferably is a heterocyclic group, in particular a heteroaryl group, such as a hydroxy pyridonyl group (which may also be referred to as a hydroxy pyridinyl N-oxide group) or a hydroxy quinolonyl group (which may also be referred to as a hydroxy quinolinyl N-oxide group). Specific examples include a 1-hydroxy-2-pyridonyl group, a 1-hydroxy-2-quinolonyl group, or salts thereof. One skilled in the art would recognize that isomers and tautomers of these can also be used.

In a third embodiment of the present invention, the functional group comprises at least one heterocyclic group, including a heteroaryl group, having at least one OH group, or salts thereof. Preferably the heterocyclic group is a nitrogen-containing heteroaryl group, such as a pyridinyl group or a quinolinyl group, and the functional group is a hydroxy pyridinyl group or a hydroxy quinolinyl group. The hydroxy group is preferably at a position on the heteroaryl group such that it is geometrically close to the heteroatom, such as ortho to the heteroatom. Such a group may be in the salt form. For example, the functional group may comprise a 2-hydroxy pyridinyl group or a 2-hydroxy-quinolinyl group, as well as an 8-hydroxy-quinolinyl group or salts thereof. Other isomers or tautomers will also be known to one skilled in the art. Preferably the functional group comprises an 8-hydroxy-quinolinyl group. In addition, the heteroaryl group may further comprise additional groups, including, for example, electron withdrawing groups such as chloro or nitro groups, in order to lower the pKa of the OH group.

For this embodiment, the functional group may also comprise at least one heteroaryl group having at least two OH groups. When there are two OH groups, preferably the OH groups are in positions ortho to each other on the heteroaryl group. When there are more than two OH groups, it is preferred that at least two of the OH groups are in positions ortho to each other on the heteroaryl group. For example, the functional group may be a dihydroxy-pyridinyl group, such as a 2,3-dihydroxy-pyridinyl group (which can also be referred to as a 3-hydroxy-2-pyridonyl group), a 3,4-dihydroxy-pyridinyl group (which can also be referred to as a 3-hydroxy-4-pyridonyl group), a 2,3-dihydroxy-quinolinyl group (which can also be referred to as 3-hydroxy-2-quinolonyl group), or a 3,4-dihydroxy-quinolinyl group (which can also be referred to as a 3-hydroxy-4 quinolonyl group). Other isomers and tautomers will also be known to one skilled in the art.

In a fourth embodiment of the present invention, the functional group comprises at least one phosphonic acid group, a partial ester thereof, or salts thereof and at least one second ionic, ionizable group, or basic group. The second group is not a phosphonic acid group or salt thereof. Preferably, the second ionic or ionizable group is a carboxylic acid group, a sulfonic acid group, or a salt thereof. Preferably the basic group is a Lewis base, such as an OH group (a hydroxyl group) or an amino group. Preferably these two groups are geminal to each other (i.e., directly bonded to the same carbon atom.) or vicinal to each other (i.e., directly bonded to adjacent carbon atoms). Thus, for example, when the second ionic or ionizable group is a carboxylic acid group or salt thereof, the functional group may have the formula —$CQ(PO_3H_2)$ $(CO_2H)$ or salts thereof. Q, which is bonded to the geminal position, may be any of those described above. Preferably, Q is H. In addition, the functional group may have the formula —$(CH_2)_n$—$CQ(PO_3H_2)(CO_2H)$ or salts thereof, wherein n is 0 to 9 and is preferably 0 to 3.

As a further example for this embodiment, the functional group may comprise at least one phosphonic acid group, a partial ester thereof, or salts thereof and at least one hydroxy group or salt thereof, such as a group having the formula —X—$(PO_3H_2)(OH)$ or salts thereof, wherein X is as described above. Preferably, X is an arylene group and, for this preferred formula, the phosphonic acid group and hydroxy group are in positions ortho to each other. When these groups are geminal, the functional group may have the formula —$CR(PO_3H_2)(OH)$ or salts thereof, wherein R is H or a C1-C6 alkyl group. Preferably, R is H. Also, the functional group may have the formula —$(CH_2)_n$—$CR(PO_3H_2)$ $(OH)$ or salts thereof, wherein n is 0 to 9 and is preferably 0 to 3.

In a fifth embodiment of the present invention, the functional group comprises a heteroaryl group having at least one carboxylic acid group or salt thereof. While the heteroaryl group may be any of those known in the art, preferably the heteroaryl group is a nitrogen containing heteroaryl group, such as a pyridinyl group, a pyrimidinyl group, a pyrrolyl group, a quinolinyl group, or a pyrazinyl group. Preferably the functional group comprises two carboxylic acid groups or salts thereof. These acid groups may be anywhere on the heteroaryl ring but are preferably either ortho or meta to each other. Furthermore, when the heteroaryl group contains at least one nitrogen atom, it is preferred that the two acid groups are both adjacent to (that is, ortho to) the nitrogen atom. Thus, for example, the heteroaryl group may be a 2,6-pyridinyl-dicarboxylic acid group.

In a sixth embodiment of the present invention, the functional group comprises an aryl group having at least one nitroso group and at least one OH group, or a salt thereof. The two groups may be located anywhere on the aryl group. Preferably, the aryl group is a phenyl group and the nitroso and OH groups are in positions ortho to each other. The aryl group may further comprise other substituents, such as alkyl groups, halogen groups, ether groups and the like, including electron withdrawing groups, such as chloro and nitro groups, capable of lowering the pKa of the organic group, regardless of which tautomeric form it is in. For example, the functional group can be a nitrosophenolic group, such as a group having the formula —$C_6H_3(OH)(NO)$ or, preferably a group having the formula —$C_6H_2Z(OH)(NO)$, wherein Z is an electron withdrawing group such as chloro or nitro.

In a seventh embodiment of the present invention, the functional group comprises an azoarene group. For this embodiment, the functional group may be a substituent on the non-polymeric derivative or it may be the non-polymeric dispersant. For example, the functional group may comprise a group having the formula $Ar^1$—N=N—$Ar^2$, wherein $Ar^1$ and $Ar^2$, which can be the same or different, are an arylene group, such as a phenylene or a naphthylene group, or an aryl group, such as a phenyl group or a naphthyl group, and at least one of $Ar^1$ or $Ar^2$ is an arylene group. For this embodiment, the azoarene group has an azo group and at least one and preferably at least two OH groups, at least one and preferably at least two $NH_2$ groups, or at least one OH group and at least one $NH_2$ group. Thus, for example, the azoarene group may have the formula —$(HO)Ar^1$—N=N—$Ar^2(OH)$ (a bis-hydroxy azoarene group), —$(H_2N)Ar^1$—N=N—$Ar^2(NH_2)$ (a bis-amino azoarene group), or —$(HO)Ar^1$—N=N—$Ar^2(NH_2)$ or —$(H_2N)Ar^1$—N=N—$Ar^2(OH)$ (an amino-hydroxy azoarene group). Other combinations may also be possible. Preferably, the OH and/or $NH_2$ groups are located at positions ortho to the azo group (the N=N group). For example, the functional group may be a group having the formula —$(H_2N)C_6H_3$—N=N—$C_6H_4(NH_2)$. Also, electron withdrawing groups, such as chloro or nitro groups, may be included on the aryl and/or arylene groups. Thus, preferably, the functional group has the formula —$(HO)C_6H_3$—N=N—$C_6H_3Z(OH)$, wherein Z is an electron withdrawing group such as chloro or nitro.

For each of these embodiments, it is preferred that the functional group of the non-polymeric dispersant be a group that has a high calcium index value. As used herein, the term "calcium index value" refers to a measure of the ability of a functional group to coordinate or bind calcium ions in solution. The higher the calcium index value, the more strongly or effectively the group can coordinate calcium ions. Such a value can be determined using any method known in the art. For example, the calcium index value may be measured using a method in which the amount of calcium coordinated by a compound in a standard solution containing soluble calcium ions and a color indicator is measured using UV-V is spectroscopy. In addition, for compounds having a strong color, the calcium index value may be measured using an NMR method. Also, for some compounds, values measured using known literature techniques can be used. Details relating to specific methods are described below.

As used herein, the term "high" in reference to the calcium index value means that the value is greater than that of a reference material. For the purposes of the present invention, the reference is phenylphosphonic acid and more preferably 1,2,3-benzene tricarboxylic acid. Thus, the functional group of the non-polymeric dispersant has a calcium index value that is greater than the calcium index value of phenyl phosphonic acid and more preferably has a calcium index value greater than or equal to that of 1,2,3-benzene tricarboxylic acid. Preferably, the functional group has a calcium index value greater than or equal to 2.79, more preferably greater than 3.0, and most preferably greater than 3.2, determined using UV-V is spectroscopy, as described in more detail below. Surprisingly it has been found that inkjet ink compositions comprising non-polymeric dispersants having the functional groups described herein, particularly those having a calcium index value greater than that of phenylphosphonic acid and more preferably greater than that of 1,2,3-benzene tricarboxylic acid, have improved properties, particularly print and stability properties, compared to conventional dispersants, particularly those that comprise functional groups having a calcium index value that is less than these reference compounds.

As a specific example of the pigment dispersion of the present invention, the non-polymeric dispersant has the formula $(F)_w$-$A'$-$(B)_y(C)_z$. $A'$ is an organic chromophore group and can be any of those described above in relationship to the colorant of the pigment used in the inkjet ink composition of the present invention. B and C are substituents on $A'$, and y and z represent the number of substituents B and C respectively. The value of y and z can be from 0 to the total number of available sites on the organic chromophore group and is preferably 0, 1, 2, 3, or 4. When y and/or z are greater than 1, each B substituent can be the same or different and each C substituent can be the same or different. Substituents B and C can be any of those described above regarding the substituent B of the colorant of the pigment used in the inkjet ink composition of the present invention. However, for the non-polymeric dispersant, B and C are different. In this example, F comprises the functional group, which can be any of those described above, and w represents the number of substituents F on $A'$, which can be 1, 2, or 3. Also, F may comprise multiple organic chromophore groups, thus having the formula F-$[A'$-$(B)_y(C)_z]_r$, wherein r represents the number of organic chromophore groups and can be 1, 2, or 3. Preferably, w and r are 1.

For this specific example, the pigment can comprise a colorant having the formula A-$(B)_x$, as described above. Thus, in this example, the non-polymeric dispersant and the colorant of the pigment both comprise organic chromophore groups. This group may be the same organic chromophore or may be different—A and $A'$ may be the same or different. As particular examples, the organic chromophore group of the colorant may be a quinolonoquinolonyl group and the organic chromophore group of the non-polymeric dispersant may a quinolonoquinolonylene group—i.e., both organic chromophore groups may be a quinolonoquinolone chromophore group. Also, the organic chromophore group of the colorant may be a 2-(phenylazo)-N-(phenyl)-3-oxobutanamidyl group and the organic chromophore group of the non-polymeric dispersant may be a 2-(phenyleneazo)-N-(phenylene)-3-oxobutanamide group, both being the same azo chromophore. In addition, both A and $A'$ may be phthalocyanine groups (A being a phthalocyaninyl group and $A'$ being a phthalocyaninylene group) or may both be quinacridone groups (A being a quinacridonyl group and $A'$ being a quinacridonylene group). Alternatively, the organic chromophore groups of the colorant and the non-polymeric dispersant may be different from each other. For example, the organic chromophore group of the colorant may be a phthalocyaninyl group and the organic chromophore group of the non-polymeric dispersant may be a quinacryidonylene group. Other mixed combinations of pigment colorant and non-polymeric dispersant organic chromophore groups are also possible.

When A and $A'$ are the same, the substituents on each can be the same or different. For example, if the organic chromophore group of both the colorant and the non-polymeric dispersant have the same type and number of substituents, then x equals y, and z is 0. If neither has attached substituents, then both y and z are 0, and the organic chromophore group of both the non-polymeric dispersant and the colorant is the same as the colorant itself. Also, the substituents bonded to the organic chromophore groups of the colorant and the non-polymeric dispersant can differ, either in number, type, or both. For example, the organic chromophore group of the non-polymeric dispersant may comprise the same types of substituents as the organic chromophore group of the colorant, but fewer of them. In this case, y is less than x, and z is 0. Also, the organic chromophore group of the non-polymeric group may comprise different substituents than the organic chromophore group of the polymer group. In this case, y is 0 and z is 1, 2, or 3. Furthermore, the organic chromophore group of the non-polymeric dispersant may comprise some of the same substituents as the organic chromophore group of the colorant, but fewer of them, as well as at least one additional substituent. In this case, y is less than x and z is 1, 2, or 3.

Also for this specific example, the pigment can be a carbon black pigment. Any of those described above may be used. For example, the organic chromophore group of the non-polymeric dispersant is either a quinacridonylene group or a 2-(phenyleneazo)-N-(phenylene)-3-oxobutanamide group and the pigment is carbon black. The carbon black pigment can have a wide range of BET surface areas, as measured by nitrogen adsorption, depending on the desired properties of the pigment. Preferably, the pigments have a BET surface area between about 10 $m^2/g$ and about 1500 $m^2/g$, more preferably between about 20 $m^2/g$ and about 600 $m^2/g$. Also, the carbon black pigment can have a wide variety of primary particle sizes known in the art. For example, the pigment may be a carbon black having a primary particle size of between about 5 nm to about 100 nm, including about 10 nm to about 80 nm and 15 nm to about 50 nm. In addition, the carbon black pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g.

As another specific example of the pigment dispersion of the present invention, the non-polymeric dispersant comprises at least one organic chromophore group that is capable of interacting with the pigment used in the dispersion, such as an inkjet ink composition. For this example, any of the pigments described above may be used, and, in particular, the pigment comprises a colorant having the formula A-$(B)_x$, wherein A, B, and x are as described above. Thus, the non-polymeric dispersant comprises at least one organic chromophore group, Q, capable of interacting with the colorant of the pigment. Any of the organic chromophore groups described above for A and A' can be used, as long as the group interacts with the pigment. It is preferred that the interaction between Q and the pigment is strong and therefore preferred types of interactions would include hydrogen bonding and pi-pi stacking. Also, Q may co-crystallize with the pigment, such as by intercalating into the crystal structure through any of the various mechanisms known in the art. Strong interaction between Q of the non-polymeric dispersant with the pigment, including with the colorant of the pigment, has surprisingly been found to form stable dispersions of the pigment that are also thermally stable and can be printed, for example, by an inkjet ink printing process to form images having good overall properties.

The non-polymeric dispersant may be prepared using a variety of different techniques. For example, when the non-polymer dispersant comprises an organic chromophore group as described above, the dispersant may be prepared using methods known for preparing this specific type of chromophore group, except using at least one component that comprises the desired functional group. Also, a component comprising a precursor or derivative of the functional group may be used, which is then converted to the desired functional group after the organic chromophore group is prepared. In addition, the non-polymeric dispersant may be prepared from a conventional non-polymeric dispersant by modifying or functionalizing the dispersant to comprise at least one functional group.

The dispersions of the present invention can be prepared using any method known in the art. For example, the pigment and the liquid vehicle may be combined with agitation to produce a mixture, and the non-polymeric dispersant may then be added. Alternatively, the non-polymeric dispersant can be combined with the pigment, and the resulting combination can then be combined with the liquid vehicle. The pigment, dispersant, and vehicle may be combined in any equipment known in the art, such as a media or ball, or other high shear mixing equipment. Various conventional milling media can be used. Other methods for forming the dispersion of the present invention will be known to one skilled in the art.

The dispersion of the present invention may be further purified or classified to remove impurities and other undesirable free species which can co-exist in the dispersion as a result of the manufacturing process. For example, the dispersions can be subjected to a classification step, such as filtration, microfiltration, or centrifugation, to substantially remove particles having a size above about 1.0 micron. The removal of impurities from the dispersions may also improve the performance of these dispersions when used in various applications, including, for example, ink compositions (such as inkjet ink compositions) and coating compositions.

The present invention further relates to compositions comprising the dispersions of the present invention. For example, the dispersions may be used in aqueous or non-aqueous inks and coatings, including, for example, automotive and industrial coatings, paints, adhesives, latexes, and inks, and may also be used in the preparation of toners, including chemical toners, plastic compositions, rubber compositions, paper compositions, and textile compositions.

The dispersions have been found to be useful in ink compositions, especially inkjet ink compositions. Therefore, the present invention further relates to an ink composition, such as an aqueous inkjet ink composition, comprising the dispersion of the present invention. The amount of dispersion used can be any amount such that the pigment is present in the composition in an amount effective to provide the desired image quality (for example, optical density) without detrimentally affecting the performance of the inkjet ink. For example, typically, the pigment will be present in an amount ranging from about 0.1% to about 20% based on the weight of the inkjet ink composition. The amount of the non-polymeric dispersant can vary depending on such factors as the type of pigment, pigment surface area, and the type of functional group. Typically, the non-polymeric dispersant is used at levels from about 0.5 to about 100 parts by weight relative to 100 parts by weight pigment. For inkjet ink compositions, the non-polymeric dispersant is preferably used at levels from about 30 to about 50 parts by weight relative to 100 parts by weight pigment, which have been found to produce inkjet inks with good dispersion properties, such as large pigment particle sizes. For example, the particle size of the pigment in the inkjet ink composition of the present invention are generally about 200 nm or less.

The inkjet ink composition of the present invention can be formed with a minimum of additional components (additives and/or cosolvents) and processing steps. However, suitable additives may be incorporated in order to impart a number of desired properties while maintaining the stability of the compositions. For example, additional surface active agents, in addition to the non-polymeric dispersants described above, humectants, drying accelerators, penetrants, biocides, binders, and pH control agents, as well as other additives known in the art, may be added. The amount of a particular additive will vary depending on a variety of factors but generally ranges between 0% and 40%.

Surface active agents that differ from the non-polymeric dispersing agents described above, may be added to further enhance the colloidal stability of the composition or to change the interaction of the ink with either the printing substrate, such as printing paper, or with the ink printhead. Various anionic, cationic and nonionic surface active agents can be used in conjunction with the ink composition of the present invention, and these may be in solid form or as a water solution.

Representative examples of anionic surface active agents include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates, alkyl phosphates, and alkyl phosphonates. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad®19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic surface active agents that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols (such as Surfynol® 420, Surfynol® 440, and Surfynol® 465, available from Air Products), polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.), Brij® Series materials (ICI Americas, Inc.), and Triton® series materials (Union Carbide Company). These nonionic surface active agents can be used alone or in combination with the aforementioned anionic and cationic dispersants.

The surface active agent may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, such as Elvanols from DuPont, Celvoline from Celanese, polyvinylpyrrolidones such as Luvatec from BASF, Kollidon and Plasdone from ISP, and PVP-K, Glide, acrylic or methacrylic resins (often written as "(meth)acrylic") such as poly(meth)acrylic acid, Ethacryl line from Lyondell, Alcosperse from Alco, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, such as the Joncryl line from BASF, Carbomers from Noveon, styrene-(meth)acrylic acid-(meth)acrylate ester copolymers, such as the Joncryl polymers from BASF, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, such as the SMA polymers from Sartomer, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof. Polymers, such as those listed above, variations and related materials, that can be used for dispersants and additives in inkjet inks are included in the Tego products from Degussa, the Ethacryl products from Lyondell, the Joncryl polymers from BASF, the EFKA dispersants from Ciba, and the Disperbyk and Byk dispersants from BYK Chemie.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithiodiethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols (Elvanols from DuPont, Celvoline from Celanese), hydroxypropylenecellulose, hydroxyethylcellulose, polyvinylpyrrolidinone (such as Luvatec from BASF, Kollidon and Plasdone from ISP, and PVP-K, Glide), polyvinylether, starch, polysaccharides, polyethyleneimines with or without being derivatized with ethylene oxide and propylene oxide including the Discole® series (DKS International); the Jeffamine® series (Huntsman); and the like. Additional examples of water-soluble polymer compounds include various dispersants or surfactants described above, including, for example, styrene-acrylic acid copolymers (such as the Joncryl line from BASF, Carbomers from Noveon), styrene-acrylic acid-alkyl acrylate terpolymers, styrene-methacrylic acid copolymers (such as the Joncryl line from BASF), styrene-maleic acid copolymers (such as the SMA polymers from Sartomer), styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers (such as NeoCryl materials from NSM Neoresins, the AC and AS polymers from Alberdingk-Boley) or may be a water dispersible polyurethane (such as ABU from Alberdingk-Boley) or polyester (such as AQ polymers from Eastman Chemical). Polymers, such as those listed above, variations and related materials, that can be used for binders in inkjet inks are included in the Ethacryl products from Lyondell, the Joncryl polymers from BASF, the NeoCryl materials from NSM Neoresins, and the AC and AS polymers Alberdingk-Boley.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an $OH^-$ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate $OH^-$ ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate conventional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink compositions can be purified and/or classified using any method known in the art, including for example, ultrafiltration/diafiltration using a membrane, reverse osmosis, and ion exchange as well as filtration, centrifugation, or a combination of the two methods. In this way, unwanted impurities or undesirable large particles can be removed to produce an inkjet ink composition with good overall properties.

It has surprisingly been found that inkjet ink compositions comprising the non-polymeric dispersants described herein have improved overall properties compared to previously described inkjet ink compositions. While not wishing to be bound by theory, it is believed that a non-polymeric dispersant comprising the functional groups described above, particularly those with a calcium index value as set forth above, produce stable dispersions of pigments that rapidly destabilize when in contact with a substrate, such as paper. The destabilization may be a result of an interaction or binding with calcium salts or other divalent metal salts present in or on the substrate, whether present in the substrate or whether subsequently added, such as by printing with a fixer fluid containing metal salts. Alternatively, or in addition, destabilization may result from a change in pH on contact with the substrate, which may be particularly advantageous for pigments having the attached functional groups described above. It is believed that the rapid destabilization after printing, caused either by a change in pH, interaction with calcium, or both, results in printed images with good overall properties, such as optical density, edge acuity, and/or intercolor bleed.

The present invention will be further clarified by the following examples, which are intended to be only exemplary in nature.

EXAMPLES

Examples 1-4

The following examples describe the preparation of non-polymeric dispersants useful in the inkjet ink compositions of the present invention.

Example 1

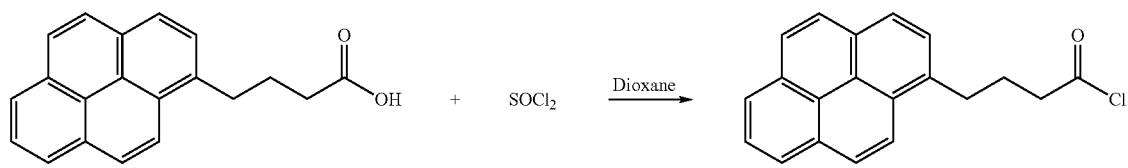

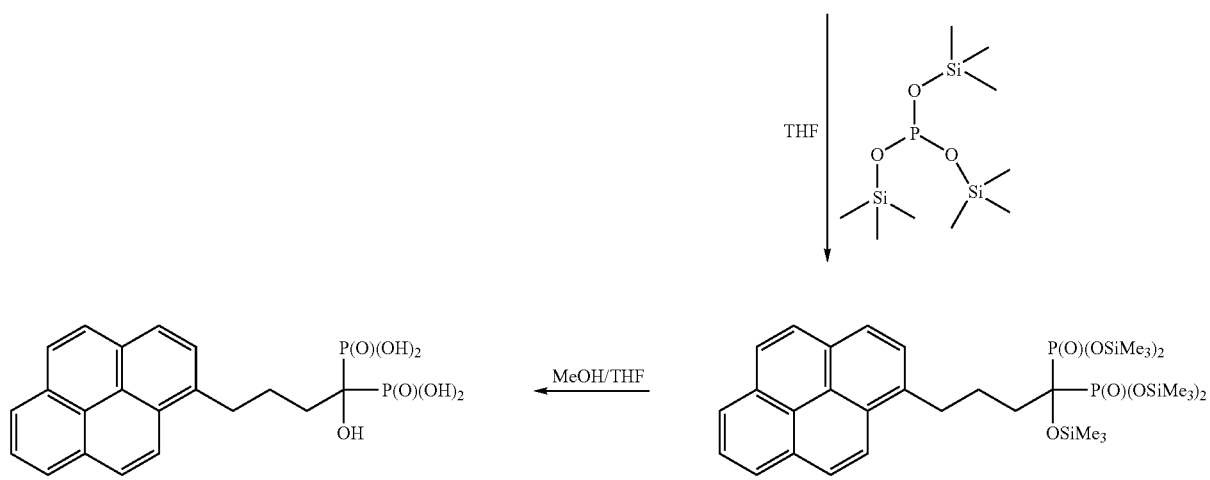

γ-(Pyrene-3-yl)-butyric acid (21.4 g, 74.3 mmol) was dissolved in 200 mL of anhydrous dioxane, and to this solution was added 52.6 g of thionyl chloride (6 eq.). The solution was refluxed for 4 hours, and the volatiles were evaporated under vacuum. The residue was co-evaporated with 2×100 mL of dioxane to completely remove excess amount of thionyl chloride and finally dissolved in 200 mL of anhydrous THF.

To this THF solution was added 53.3 g (2.4 eq.) of tris(trimethylsilyl)phosphite. The mixture was stirred at room temperature for 3 hours, after which all the volatiles were evaporated under vacuum. To the residue was added 200 mL of fresh THF and 50 mL of methanol. The mixture was stirred at room temperature overnight, and then the solvents were again evaporated in vacuo. The resulting product was used without further purification.

Example 2

NaOH (3.9 g, 97.5 mmol) was dissolved in water (60 ml) at 0° C. in a 250 mL 3-neck round bottom flask equipped with thermometer and addition funnel. Sodium alendronate (9.75 g, 30 mmol) was then added to this solution and dissolved at the same temperature. Then, 4-nonyl benzoyl chloride (10 g, 37.5 mmol) was added dropwise to the above mixture while keeping the temperature <10° C. After the addition was complete, the reaction was stirred at 0° C. for 30 minutes. A precipitate formed that was removed by filtration (excess 4-nonylbenzoic acid), and the pH of the filtrate was adjusted with conc. HCl to pH 3. The filtrate was then poured into ethanol (250 mL) and left overnight in refrigerator. The resulting precipitate was removed by filtration and dried in vacuum oven at 50° C., yielding 10 g of sodium alendronate 4-nonylbenzylamide, which was used without further purification.

Example 3

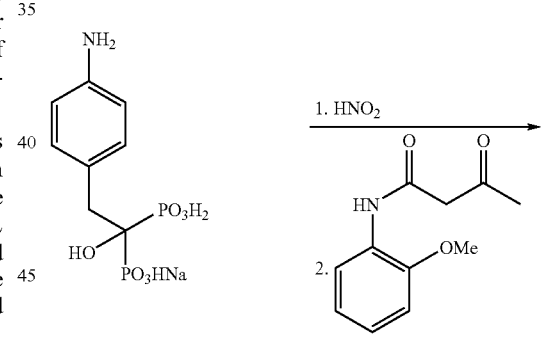

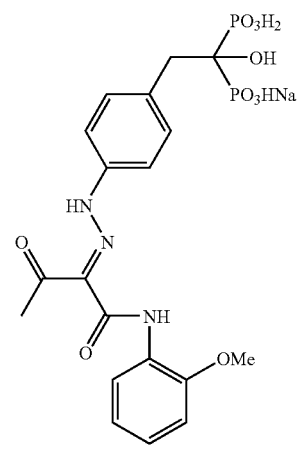

Approximately 16.5 g of 2-(4-aminophenyl)-1-hydroxy-ethylidene-1,1-bisphosphonic acid (EBP, mixture of mono- and disodium salts ~1:1) was mixed with 250 mL ice-water, and 40 mL of concentrated HCl was added. The amine was diazotized by drop-wise addition of 3.45 g of sodium nitrite, dissolved in 20 mL water. Excess nitrous acid was destroyed by addition of approximately 0.1 g of sulfamic acid, and this diazo-EBP solution was kept on ice until used for the coupling reaction.

In a separate vessel, 10.46 g of acetoacet-o-anisidide (AAOA) was dissolved in a solution of 2.5 g sodium hydroxide in 300 mL water. The resulting solution was cooled to 5° C., and AAOA was reprecipitated as a fine dispersion by the drop-wise addition of 6.5 g of glacial acetic acid, which was then buffered by addition of 15 g of sodium acetate. To this was added the diazo-EBP solution drop-wise with vigorous stirring over 1 hr time period. The mixture was stirred for 1.5 hours at 5° C. and then quickly filtered. The resulting yellow precipitate was removed by filtration, washed with a small amount of ice water, and dried in the vacuum oven at 60° C., yielding 10.29 g (38.3%) of the desired product (EBP-AAOA), which was found to be water soluble (UV-VIS $\lambda_{max}$=383 nm).

Example 4

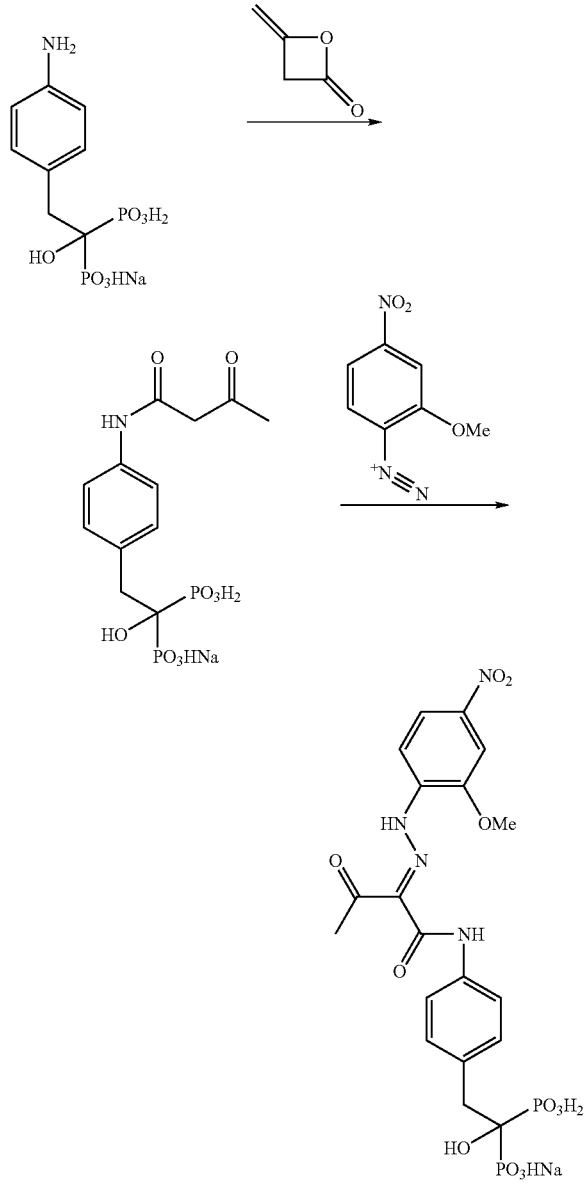

Approximately 16.5 g of 2-(4-aminophenyl)-1-hydroxy-ethylidene-1,1-bisphosphonic acid (EBP, mixture of mono- and disodium salts ~1:1) was mixed with 150 mL ice-water, and 8.4 g of diketene was added dropwise under intensive stirring. After 1.5 hours, all of the diketene was consumed, and the resulting coupler solution (AAOA-EBP) was bufferized by addition of 15 g of sodium acetate, which was then chilled to 5° C.

In a separate vessel, 8.4 g of 4-nitro-2-anisidine (PNOA) was mixed with 100 mL of ice water and 15 mL of concentrated HCl, and this mixture was diazotized by drop-wise addition of 3.45 g of sodium nitrite, dissolved in 20 mL water. Excess nitrous acid was destroyed by addition of approximately 0.1 g of sulfamic acid, and diazo-PNOA solution was kept on ice until used for the coupling reaction.

The diazo-PNOA solution was added dropwise to the AAOA-EBP coupler solution at 5° C., and the pH was maintained between 4.5 and 5.5 by addition of solid sodium acetate. The resulting yellow slurry was stirred for an additional 3 hours. After this time, the yellow precipitate was removed by filtration and washed with ice water, yielding 14.5 g (50%) of the desired product (PNOA-AAOA-EBP).

Examples 5-6

The following examples describe the preparation and performance of inkjet ink compositions of the present invention.

Example 5

A mixture of 6.6 g of the compound prepared in Example 1, 20 g of Black Pearls® 700 carbon black (available from Cabot Corporation), and 100 mL of N-methylpyrrolidone was stirred for 15 minutes. This mixture was then added dropwise over a period of 10 minutes to an aqueous base solution (prepared by diluting approximately 5.8 g of a 10% aqueous NaOH solution with 1 L of water) which was being stirred using a Proscientific rotor-stator high intensity mixer (9000-10000 rpm), producing a carbon black dispersion having a particle size of 195.5 nm. The resulting dispersion was purified by membrane filtration using a Spectrum membrane (part no. M205-300-01P) using 10 volumes of DI water and then sonicated for 30 minutes (Misonix 3000 at a power of 4.5) to produce a carbon black dispersion with median particle size of 155.7 nm (mean volume particle size, mV, was measured using a Microtrac® Particle Size Analyzer). The results show that the compound of Example 1 is an effective non-polymeric dispersant for this pigment.

An inkjet ink composition of the present invention was prepared using this dispersion having the following composition: 4% carbon black, 20% isopropanol, and the balance water. These were drawn down on Hammermill Copy Plus, a conventional office paper, using a #3 wound wire rod. Optical density was measured using a SpectroEye, manufactured by Gretag Macbeth. Results are shown in Table 1 below.

TABLE 1

| Example | OD |
|---|---|
| 5 | 1.43 ± 0.01 |
| 6 | 1.34 ± 0.01 |
| Cab-O-Jet ® 200 | 1.06 ± 0.02 |
| Cab-O-Jet ® 300 | 1.09 ± 0.01 |

The results show that inkjet ink compositions of the present invention, comprising a non-polymeric dispersant having the described functional groups, have improved optical density compared to Cab-O-Jet® 200 black colorant (an aqueous dispersion of a modified carbon black pigment having attached $SO_3Na$ groups commercially available from Cabot Corporation) and Cab-O-Jet® 300 black colorant (an aqueous dispersion of a modified carbon black pigment having attached $CO_2Na$ groups commercially available from Cabot Corporation).

Example 6

10 g of Black Pearls® 700 carbon black (available from Cabot Corporation) and 3 g of the compound prepared in Example 2 were combined in 200 g of 1-methyl-2-pyrrolidinone (NMP), and the mixture was added to approximately 700 g of 0.07-0.125 mm $ZrSiO_4$ milling media in an Eiger mill. While mixing at 5000 rpm, additional amounts of NMP were used to ensure good mixing. After 10 minutes of milling time, the mean volume particle size (mV) of the dispersion in NMP was measured using a Microtrac® Particle Size Analyzer and found to be 0.4897 nm. At this time, 7.18 g of a 10% aqueous NaOH solution was added drop-wise to the milling sample, and the mixture turned slightly grey. To this was then slowly added 1 L of water, and the mixture gradually returned to a shiny black color. The mean volume particle size of the dispersion after addition of water was found to be 0.5583 nm.

The sample was then milled for 10 more minutes, and the milling media was filtered off using a coarse (40-60 µm) fritted filter, followed by a water wash, thereby diluting the sample. The mean volume particle size of the dispersion in water after filtration was found to be 0.6193 nm. The dispersion was then concentrated from 3000 mL to 500 mL by diafiltration using a Spectrum membrane (0.05 µm/1050 $cm^2$) and passed through a 0.45 µm sieve without much solid being retained. The dispersion was then further concentrated to 300 mL using a 3100 $cm^2$ membrane. Diafiltration was continued with 5 volumes of water, and the mean volume particle size was found to be 0.2917 nm. The dispersion was finally sonicated for 30 minutes, and the mean volume particle size was found to be 0.1510 nm. The results show that the compound of Example 2 is an effective non-polymeric dispersant for this pigment.

An inkjet ink composition of the present invention was prepared using this dispersion having the following composition: 4% carbon black, 20% isopropanol, and the balance water. These were drawn down on Hammermill Copy Plus, a conventional office paper, using a #3 wound wire rod. Optical density was measured using a SpectoEye, manufactured by Gretag-Macbeth. Results are shown in Table 1 above.

The results show that inkjet ink compositions of the present invention, comprising a non-polymeric dispersant having the described functional groups, have improved optical density compared to Cab-O-Jet® 200 black colorant (an aqueous dispersion of a modified carbon black pigment having attached $SO_3Na$ groups commercially available from Cabot Corporation) and Cab-O-Jet® 300 black colorant (an aqueous dispersion of a modified carbon black pigment having attached $CO_2Na$ groups commercially available from Cabot Corporation).

Examples 7A and 7B

The following examples describe the preparation of inkjet ink compositions of the present invention.

An attritor (type 01STD from Union Process, Akron, Ohio) was charged with 10 g Pigment Yellow 74 (either dry or as a presscake, the amount of which was determined by its solids content), 100 mL water, and 500 g of zirconium silicate beads (0.07-0.125 mm). Five grams of the compound prepared in Example 3 (for Example 7A) or Example 4 (for Example 7B) was then added. Once these components were combined, mixing at 600 rpm began, and an additional 500 g of beads were also added. After mixing for 2 hours, the media was filtered off using a coarse fritted filter, and the media was washed with 200 mL of water. The filtered yellow dispersions were sonicated (2 hours for Example 7A and 3 hours for Example 7B). The mean volume particle size (mv) of the resulting dispersions was measured using a UPA Microtrac laser scattering equipment, and the results are shown below in Table 2 below, along with the calculated dispersion yield (which is based on total amount of pigment used).

TABLE 2

| Ex # | Pigment | Non-Polymeric Dispersant | Sonication time | Dispersion yield | mv |
|---|---|---|---|---|---|
| 7A | PY74 | Example 3 (EBP-AAOA) | 3 hrs | 75% | 161 nm |
| 7B | PY74 | (Example 4) PNOA-AAOA-EBP | 2 hrs | 75% | 136 nm |

The results show that the compounds of Example 3 and Example 4 are effective non-polymeric dispersants for this pigment and that the resulting dispersion could be used to prepare an inkjet ink composition.

Example 8

This example describes methods for determining calcium index values.

Method A

For this method, a series of solutions were prepared at pH 9 that contained 0.087 mM Congo Red indicator, 5 mM cesium chloride, 1 wt % MW350 polyethylene glycol methyl ether, and calcium chloride in concentrations ranging from 0 to 7 mM (0.2, 0.5, 1, 2, 3, 4, 4.5, 5, 6, and 7 mM). The UV-V is spectra of these solutions were recorded within 1 hour of their preparation using a UV-2501PC spectrometer manufactured by Shimadzu Corporation. These spectra were used to create a calibration curve relating the absorbance at 520 nm to the calcium concentration.

A compound was then chosen that corresponds to a specific organic group attached to a pigment. For example, for a modified carbon black comprising a carbon black pigment having attached a 3,4,5-tricarboxyphenyl group or salts thereof, 1,2,3-benzene tricarboxylic acid would be chosen. Test solutions were then prepared at pH 9 that contained 0.087 mM Congo Red indicator, 1 wt % MW350 polyethylene glycol methyl ether, 5 mM calcium chloride, and the cesium salt of the compound of interest such that the ion concentration at pH 9 was 5 mM. The uncomplexed calcium concentration was determined by comparison with the calibration curve. The calcium index value was then calculated as $\log_{10}((0.005-\text{uncomplexed calcium})/((\text{uncomplexed calcium})^2))$. Measurements were made in duplicate and averaged.

Using this method, the calcium index values of various compounds, relating to the organic groups of modified pigments comprising pigments having these organic groups attached, were determined and are shown in Table 3 below.

TABLE 3

| Compound | Calcium index value |
| --- | --- |
| Toluene sulfonic acid | 0.78 |
| benzoic acid | 1.27 |
| isophthalic acid | 1.76 |
| phthalic acid | 2.05 |
| succinic acid | 2.37 |
| benzohydroxamic acid | 2.43 |
| 1,2,4-benzene tricarboxylic acid | 2.53 |
| benzenephosphonic acid | 2.53 |
| 1,2,3-benzene tricarboxylic acid | 2.79 |
| 2,3-dihydroxypyridine | 3.06 |
| 8-hydroxyquinoline | 3.08 |
| 2-hydroxypyridine oxide | 3.27 |
| methylene diphosphonic acid | 3.45 |

Thus, as the data in Table 3 shows, compounds such as 2-hydroxypyridine N-oxide (1-hydroxy pyridone), 8-hydroxyquinoline, and methylene diphosphonic acid have calcium index values greater than that of 1,2,3-benzene tricarboxylic acid. These also have calcium index values greater than or equal to that of benzene phosphonic acid (phenylphosphonic acid). Compounds comprising these or similar groups, such as other bisphosphonates or groups having at least two phosphonic acid groups, partial esters thereof, or salts thereof, would also be expected to have similarly high calcium index values.

Method B

For compounds which develop a high level of color and are therefore difficult to use in Method A, a second method was developed. For this method, an aqueous solution that was 0.01M in $^{43}CaCl_2$, 0.01M in NaCl, 10% $D_2O$ and at pH 8 or 9 was prepared from $^{43}CaCO_3$, $HCl/D_2O$, $NaOH/D_2O$, $D_2O$ and water. The pH was chosen to ionize the compound under investigation and to dissolve the compound. A portion of the solution weighing about 0.65 g was added to a 5 mm NMR tube and weighed to the nearest 0.001 g. The chemical shift of the unbound $^{43}Ca$ was measured using a Bruker Avance II spectrometer with a proton resonance frequency at 400.13 MHz. A 0.2-1.0M solution of the compound (ligand) under investigation was added in successive increments. After each addition, the $^{43}Ca$ chemical shift was measured, and $\delta$, the difference between the chemical shift of the sample and that of unbound calcium was calculated. The successive increments were planned such that the $L_o/Ca_o$ ratio was 0.25, 0.5, 1, 2, 3, 4, 6 and 8 where $L_o$ is the total concentration of complexed, protonated and free anions from the ligand and $Ca_o$ is the total concentration of calcium in all species present. The calcium binding index (NMR) was calculated as $\log_{10}(X)$ where X was determined by fitting the parameters X and $\delta_m$ in the equation $$\delta = \frac{\delta_m}{2}\{[1 + (L_0/Ca_0) + (1 + H^+/K_a)/(XCa_0)] - \sqrt{[1 + (L_0/Ca_0) + (1 + H^+/K_a)/(XCa_0)]^2 - 4(L_0/Ca_0)}\}$$

so that the RMS difference between the data and the predicted chemical shifts from the equation are minimized where $\delta$ is the difference in the $^{43}Ca$ chemical shift of the sample vs that of free aqueous $^{43}Ca^{2+}$ $\delta_m$ is the calculated difference in the $^{43}Ca$ chemical shift at infinite L/Ca vs that of free $^{43}Ca^{2+}$ $L_o$ is the total concentration of complexed, protonated and free anions from the ligand $Ca_o$ is the total concentration of calcium in all species present X is a fitting parameter $K_a$ is the proton dissociation constant for the ligand LH Using this method, the calcium index values of various compounds, relating to the organic groups of modified pigments comprising pigments having these organic groups attached, were determined and are shown in Table 4 below.

TABLE 4

| Compound | Calcium index value |
| --- | --- |
| benzoic acid | 0.58 |
| 1,2,3-benzene tricarboxylic acid | 1.99 |
| 2-chloro-4-methyl-6-nitrosophenol | 2.22 |

The calcium index values by Method B are different than those done by Method A and cannot be compared directly with them.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A dispersion comprising a) a liquid vehicle, b) a pigment, and c) a non-polymeric dispersant comprising at least one group having an affinity to said pigment and at least one functional group having a calcium index value greater than or equal to a calcium index value of 1,2,3-benzene tricarboxylic acid, wherein the vehicle is an aqueous vehicle, and wherein the functional group comprises at least one hydroxy pyridonyl group or at least one hydroxy quinolonyl group.

2. A dispersion comprising a) a liquid vehicle, b) a pigment, and c) a non-polymeric dispersant comprising at least one grouop having an affinity to said pigment and at least one functional group having a calcium index value greater than or equal to a calcium index value of 1,2,3-benzene tricarboxylic acid, wherein the vehicle is an aqueous vehicle, and wherein the functional group comprises at least one hydroxy pyridinyl group or at least one hydroxy quinolinyl group.

3. A dispersion comprising a) a liquid vehicle, b) a pigment, and c) a non-polymeric dispersant comprising at least one group having an affinity to said pigment and at least one functional group having a calcium index value greater than or equal to a calcium index value of 1,2,3-benzene tricarboxylic acid, wherein the vehicle is an aqueous vehicle, and wherein the functional group comprises at least one phosphonic acid group or a salt thereof and at least one second ionic, ionizable, or basic group vicinal or geminal to the phosphonic acid group or salt thereof.

4. The dispersion of claim 3, wherein the functional group has the formula —CR═C(PO$_3$H$_2$)$_2$ or salts thereof, wherein R is H, a C1-C6 alkyl group, or an aryl group.

5. The dispersion of claim 3, wherein the second ionic, ionizable, or basic group is a carboxylic acid group, a sulfonic acid group, an hydroxyl group, or a salt thereof.

6. The dispersion of claim 3, wherein the functional group has the formula —CQ($PO_3H_2$)($CO_2H$) or salts thereof, wherein Q is H, R, OR, SR, or $NR_2$ wherein R, which can be the same or different, is H, a C1-C18 alkyl group, a C1-C18 acyl group, an aralkyl group, an alkaryl group, or an aryl group.

7. The dispersion of claim 3, wherein the functional group has the formula —CR($PO_3H_2$)(OH) or salts thereof, wherein R is H or a C1-C6 alkyl group.

8. The dispersion of claim 3, wherein the functional group has the formula —X—($PO_3H_2$)(OH) or salts thereof, wherein X is an arylene or heteroarylene goup and wherein the $PO_3H2$ and OH group, or salts thereof, are ortho to each other.

9. A dispersion comprising a) a liquid vehicle, b) a pigment, and c) a non-polymeric dispersant comprising at least one group having an affinity to said pigment and at least one functional group having a calcium index value greater than or equal to a calcium index value of 1,2,3-benzene tricarboxylic acid, wherein the vehicle is an aqueous vehicle, and wherein the functional group comprises a heteroaryl group having at least two carboxylic acid groups or salt thereof.

10. A dispersion comprising a) a liquid vehicle, b) a pigment, and c) a non-polymeric dispersant comprising at least one group having an affinity to said pigment and at least one functional group having a calcium index value greater than or equal to a calcium index value of 1,2,3-benzene tricarboxylic acid, wherein the vehicle is an aqueous vehicle, and wherein the functional group comprises an aryl group having at least one nitroso group and at least one OH group or a salt thereof.

11. The dispersion of claim 10, wherein the functional group is a nitrosophenolic group or salt thereof.

12. A dispersion comprising a) a liquid vehicle, b) a pigment, and c) a non-polymeric dispersant comprising at least one group having an affinity to said pigment and at least one functional group having a calcium index value greater than or equal to a calcium index value of 1,2,3-benzene tricarboxvlic acid, wherein the vehicle is an aqueous vehicle, and wherein the functional group comprises an azoarene group having an azo group and two $NH_2$ groups ortho to the azo group or one OH group and one $NH_2$ group ortho to the azo group and having the formula $Ar^1$—N=N—$Ar^2$, wherein $Ar^1$ and $Ar^2$, which can be the same or different, are an arylene group or an aryl group and at least one of $Ar^1$ or $Ar^2$ is an arylene group.

13. A dispersion comprising a) a liquid vehicle, b) a pigment, and c) a non-polymeric dispersant comprising at least one group having an affinity to said pigment and at least one functional group having calcium index value greater than or equal to a calcium index value of 1,2,3-benzene tricarboxylic acid, wherein the vehicle is an aqueous vehicle, and wherein the pigment comprises a colorant having the formula A-$(B)_x$; and the non-polymeric dispersant has the formula $(F)_w$-A'-$(B)_y(C)_z$ or F-[A'-$(B)_y(C)_z]_r$, wherein F comprises the functional group and A'-$(B)_y(C)_z$ or -[A'-$(B)_y(C)_z]_r$ comprises said at least one group having an affinity to said pigment, and wherein A and A' are organic chromophore groups; B is a substituent on A and A' and when x>1 each B of the colorant is the same or different and when y>1 each B of the non-polymeric dispersant is the same or different; C is a substituent on A', C is different than B, and when z>1 each C is the same or different; x, y and z are 0, 1, 2, 3, or 4 and y is less than or equal to x; and w and r are 1, 2, or 3.

14. A dispersion comprising a) a liquid vehicle, b) a pigment, and c) a non-polymeric dispersant comprising at least one group having an affinity to said pigment and at least one functional group having a calcium index value greater than or equal to a calcium index value of 1,2,3-benzene tricarboxylic acid, wherein the vehicle is an aqueous vehicle, and wherein the pigment is a carbon black pigment; and the non-polymeric dispersant has the formula $(F)_w$-A'-$(B)_y(C)_z$ or F-[A'-$(B)_y(C)_z]_r$, wherein F comprises the functional group and A'-$(B)_y(C)_z$ or -[A'-$(B)_y(C)_z]_r$ comprises said at least one group having an affinity to said pigment, and wherein A' is organic chromophore group; B is a substituent on A' and when y>1 each B is the same or different; C is a substituent on A', C is different than B and when z>1 each C is the same or different; y and z are 0, 1, 2, 3, or 4; and w and r are 1, 2, or 3.

15. A dispersion comprising a) a liquid vehicle, b) a pigment, and c) a non-polymeric dispersant comprising at least one group having an affinity to said pigment and at least one functional group having a calcium index value greater than or equal to a calcium index value of 1,2,3-benzene tricarboxylic acid wherein the vehicle is an aqueous vehicle, and wherein the pigment comprises a colorant having the formula A-$(B)_x$, wherein A is an organic chromophore group; B is a substituent on A and is the same or different when x>1; and x is 0, 1, 2, 3, or 4; and the non-polymeric dispersant comprises at least one group having an affinity to said pigment, wherein said at least one group having an affinity to said pigment comprises an organic chromophore group capable of interacting with the pigment, wherein the organic chromophore group comprises the functional group.

16. The dispersion of claim 15, wherein the organic chromophore group interacts with the pigment by hydrogen bonding, pi-pi-stacking, or by co-crystallization.

* * * * *